United States Patent [19]

Downs et al.

[11] 4,064,048
[45] Dec. 20, 1977

[54] WATER INTAKE AND FISH CONTROL SYSTEM

[75] Inventors: Dallas I. Downs, Montrose; Lory E. Larson, Garden Grove, both of Calif.; Victor J. Schuler, Middletown, Del.

[73] Assignee: Southern California Edison Company, Rosemead, Calif.

[21] Appl. No.: 436,013

[22] Filed: Jan. 23, 1974

[51] Int. Cl.² .............................................. B01D 33/00
[52] U.S. Cl. ....................................... 210/160; 61/21
[58] Field of Search ................. 61/21; 119/3; 210/160

[56] References Cited
U.S. PATENT DOCUMENTS

| | | | |
|---|---|---|---|
| 2,826,897 | 3/1958 | Vinsonhaler et al. | 61/21 |
| 2,860,488 | 11/1958 | Johnson | 61/21 |
| 2,922,282 | 1/1960 | Dohrer | 61/21 |
| 3,783,623 | 1/1974 | Ogden | 61/21 |
| 3,820,342 | 6/1974 | Stiphanov | 61/21 |
| 3,868,324 | 2/1975 | Taylor et al. | 210/160 |

Primary Examiner—Theodore A. Granger
Attorney, Agent, or Firm—Lyon & Lyon

[57] ABSTRACT

An improved water intake system with fish control means includes a watercourse through which water is drawn from a body of water containing fish and debris, a fish diversion structure mounted across the watercourse for diverting fish unavoidably sucked therein and fish removal means located at one end of the fish diversion structure for removing the diverted fish from the water in the watercourse for return to the body of water.

25 Claims, 10 Drawing Figures

WATER INTAKE AND FISH CONTROL SYSTEM

BACKGROUND OF THE INVENTION

The invention disclosed herein relates to the intake of water from a body of water containing fish under circumstances where it is desired to hold injury to fish unavoidably drawn in with the water to a minimum. For example, in steam electric generating stations water from the body of water is utilized as cooling water which is circulated through condensors to cool and condense the steam discharged from the turbine. This cooling is essential to the efficiency of the thermo-cycle. In generating stations located along ocean coast lines or lakes and rivers it is common to pump cooling water directly from the adjacent body of water, pass it through the cooling system one time and then discharge the water. These systems are known as "once through cooling systems."

Such systems normally obtain water from the adjacent body of water by running pipes out into the body of water. Water is drawn into a bowl-like conduit structure having an upwardly facing intake orifice and then flows shoreward through the pipe to a screenwell located on the shore where trash and debris is removed. The essentially debris free water is then pumped through the condenser cooling tubes and returned to the body of water. One problem associated with these systems is that the intake structure forms an artifical reef which attracts fish. Although various improvements in the design of the intake structure have been developed to avoid drawing in fish with the intake water, some fish are still drawn into the intake pipe and are carried with the flow of water to the water-course associated with the screenwell and the folliowing pumpwell.

In the screenwell, a conventional method of screening debris and fish also in the water flowing through the water-course involves the use of vertically traveling screens arranged across the intake watercourse perpendicular to the flow of the water therein. The debris in the water impinges upon the screens and is then carried up out of the water to a collection area where it is removed from the screen. However, the fish are merely left in the screenwell and unless removed will be destroyed during the cleaning process of the screenwell area. Moreover, even if removal of the fish from the screenwell is effected such heretofore used screen systems are otherwise undesirable. Fish drawn into such systems also become impinged upon the screens. Impingement of the fish for any period of time is detrimental to the fish in that they often become weakened to disease or fall victim to predators while in their weakened condition.

Therefore it is an object of the present invention, to provide a water intake system which would satisfactorily remove trash and debris while at the same time avoid injury to the fish drawn into the intake watercourse. In providing any such new system an important consideration which must be satisfied is that the primary function of the screening system must be maintained. That is, the screenwell design must provide clean water to the circulating pumps for condenser cooling by means of an effective trash removal system which has minimum hydraulic losses. Furthermore, from an economic and system reliability standpoint, it is desirable that any new system intake design utilize as nearly as possible conventional or existing hardware.

SUMMARY OF THE INVENTION

In the present invention intake water flows from the body of water through the intake structure, through the water-course and through debris removing screens. A fish diversion structure is mounted across the watercourse for diverting fish from the screens through which the main flow of water passes and fish removal means are located at one end of the fish diversion structure for removing the diverted fish to a holding chamber for return to the body of water. The fish diversion structure of the invention includes a continuous flush face across the front thereof extending towards the fish removal means at an angle of about 30° or less, and preferably about 20° or less, with respect to the direction of flow towards the diversion structure. The flush face of the structure is generally defined by the upstream face of support piers and the upstream or front face of each assembly of adjacent and vertically traveling rectangular frames positioned between the piers. Each frame includes a plurality of vertically extending and laterally spaced louver bars mounted with the side faces thereof extending substantially perpendicular to the plane of the flush face of the structure. The front of the frames and the front edges of the louver bars from which the side faces extend define the front face of the assembly.

The particular fish removal means and the holding chamber employed with the fish diversion structure may vary. For example, the fish removal means and holding chamber might consist of the quiet area system set forth in U.S. Pat. No. 3,820,342 issued June 28, 1974 to Jerome A. Stipanov, a fellow employee of two of the present inventors, at Southern California Edison Company.

However, the preferred embodiment the fish removal means includes a fish bypass guide channel which is the subject of a separate companion United States Patent Application, Ser. No. 436,012, entitled FISH BYPASS GUIDE CHANNEL filed Jan. 23, 1974 in the names of Lory E. Larson and Victor J. Schuler, two of the inventors herein. The fish bypass guide channel includes an entrance communicating with the watercourse to receive a relatively small flow of water from the watercourse and an exit removed from the watercourse communicating with the fish holding chamber. The flow of water through the fish guide channel flows into the fish holding chamber and thence out of the holding chamber through a debris removing screen.

The fish bypass guide channel includes smoothly tapering dimensions from entrance to exit such that the velocity of the water flowing through the channel is increasingly greater than the velocity of the water approaching the fish diversion structure and the channel includes a curved portion along its length of a sufficient degree of curvature so that there is no direct line of sight from the portion of the channel near the exit to the portion of the channel near the entrance. This design induces fish diverted by the diversion structure to enter the bypass guide channel and pass along its length toward the exit without returning to the watercourse.

The preferred form of the fish holding chamber is also the subject of a separate companion U.S. Pat. Application, Ser. No. 436,010, entitled FISH HOLDING CHAMBER filed Jan. 23, 1974 in the name of DallasI. Downs, one of the inventors herein now U.S. Pat. 3,938,340 issued Feb. 17, 1976. This fish holding chamber comprises inlet means communicating with the exit of the fish bypass guide channel and outlet means for removing water from the chamber and a baffle located therebetween to provide a quiet area of water in the holding chamber substantially free of directional water currents and a relatively fast moving stream of water about the quiet area of water. Fish entering the holding chamber are thereby caused to congregated in the quiet area. Fish may then readily be removed from the quiet area, as for example, by lifting the fish in a basket which is raised from underneath the fish in the quiet area out of the water in the chamber for return to the body of water. Preferably, means for returning fish from the holding chamber to the body of water includes a fish return conduit through which the fish may be returned from the raised basket into the body of water and ejected at an angle of about 20° upward from the bottom of the body of water.

Also the subject of another companion United States Patent Application is Ser. No. 436,011, entitled IMPROVED FISH DIVERSION MEANS, also filed Jan. 23, 1974 in the name of Dallas I. Downs now abandoned in favor of continuation application Ser. No. 691,768 filed June 1, 1976. This application is directed to an improvement of the present invention wherein a meshed screen is positioned across each of the traveling frames and the front edges of the louver bars to provide both for the screening of debris from the water in the watercourse as it flows through the fish diversion structure and the diversion of fish from the screens. Surprisingly, although a traveling screen apparatus screen even when set at an angle to flow does not provide for acceptable fish control the combination screen and louver bar assembly does.

DETAILED DESCRIPTION OF THE INVENTION

Figure 1:
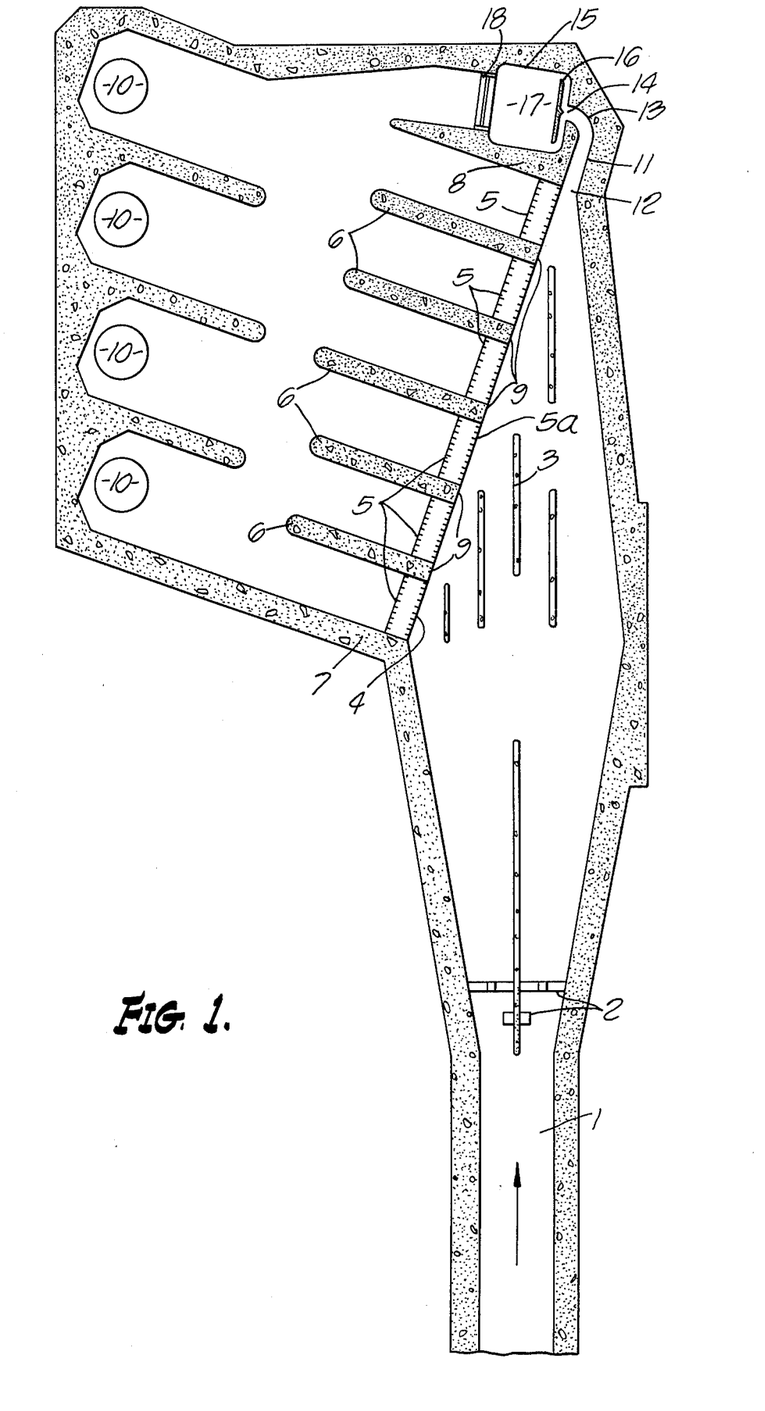
FIG. 1 is a top plan view schematically illustrating the system of the present invention.

Referring now in detail to the system of the present invention and in particular to FIG. 1, water, from a body of water (not shown) containing fish and debris enters a watercourse 1 having sidewalls forming a channel and flows past baffles 2 and guiding vanes 3 to a fish diversion structure, generally designated 4. The fish diversion structure 4 is mounted across watercourse 1 at an angle of 20° with respect to the direction of flow towards the diversion structure. The baffles 2 and guiding vanes 3 insure that the angle of approach of the water to the fish diversion structure is about 20° across the entire face of the structure and that a uniform approach velocity is maintained. It is understood that the baffle and guiding vane arrangement depicted in FIG. 1 is not essential to the operation of the invention but that any hydraulic design to maintain the desired approach velocity and angle would be equally suitable.

Fish diversion structure 4 as depicted in FIG. 1 comprises an array of six assemblies 5 of water screen units which are adjacent, vertically traveling rectangular frames each having a plurality of vertically extending, laterally spaced louver bars mounted in a plane substantially perpendicular to the front plane of the diversion structure 4. These traveling frame assemblies are described in more detail below. Briefly, however, the front edges of the louver bars and the front of the frames define a continuous flush face across the front of each traveling frame assembly. The traveling frame assemblies 5 are positioned between support piers 6, which may be rigid columns and watercourse walls 7 and 8. It is important that the front faces 9 of support piers 6 and the front faces of traveling frame assemblies 5 are flush to define a continuous flush face or straight line across fish diversion structure 4. The louver bars act to sharply turn the direction of flow of the water in watercourse 1 as it passes through the fish diversion structure. The water then flows to pumpwells and circulating water pumps 10.

Preferably, the flush faces of the traveling frame assemblies 5 are provided with a screen mounted there across to provide an single assembly which also affects the screening of debris from the water passing through traveling frame assemblies 5. If such screens are not employed debris which passes through unscreened traveling frame assemblies could be removed from the water by a much more costly system of conventional traveling screens placed downstream of the traveling frame assemblies.

Fish removal means at the end of the continuous flush face of the diversion structure preferably comprise a fish bypass guide channel 11 having an entrance 12, curved section 13 and exit 14 communicating with a fish holding chamber 15. In this embodiment of the invention a small portion of the water flowing through watercourse 1 to circulating pumps 10 is diverted through fish bypass guide channel 11 and into fish holding chamber 15 where it impinges upon baffle 16 before exiting through a conventional traveling screen assembly 18. The baffle 16 creates a quiet area of water 17 behind the baffle and a relatively fast current of water about the quiet area whereby fish entering the holding chamber 15 are maintained and congregate in the quiet area from which they may be readily removed and returned to the body of water from which they were withdrawn.

In controlling fish consideration is given to the fact that fish and other aquatic organisms with locomotive ability respond directly to horizontal velocity components in watercourses. The response may be positive, i.e., organisms are attracted to the condition; it may be negative, i.e., they are repelled; or the organisms may be overwhelmed and not able to exercise a choice of response. Not all fishes, or all size classes of any one fish, respond similarly to the same degree of stimulas, however all do respond to some degree.

Many species of fish react to horizontal velocity components by orienting themselves to face upstream in the direction of flow. It is believed that many fish which orient themselves in a downstream direction also react similarily to changes in horizontal velocity components and can thereby be guided in the direction of the change. The present invention is directed to the guiding of fish which react to changes in downstream horizontal velocity components. Other systems in the past have also attempted to guide fish but are unadaptable to control fish in a wide variety of intake systems.

One such system involved fixed louvers positioned diagonally across the intake watercourse with the sides of the louvers extending at right angles to the flow of the water in the watercourse. Such a system is described in U.S. Pat. No. 2,826,897 to R. Vinsonhaler et al. This system also suffers from the disadvantage of having debris or trash accumulating in front of the louvers.

Figure 2:
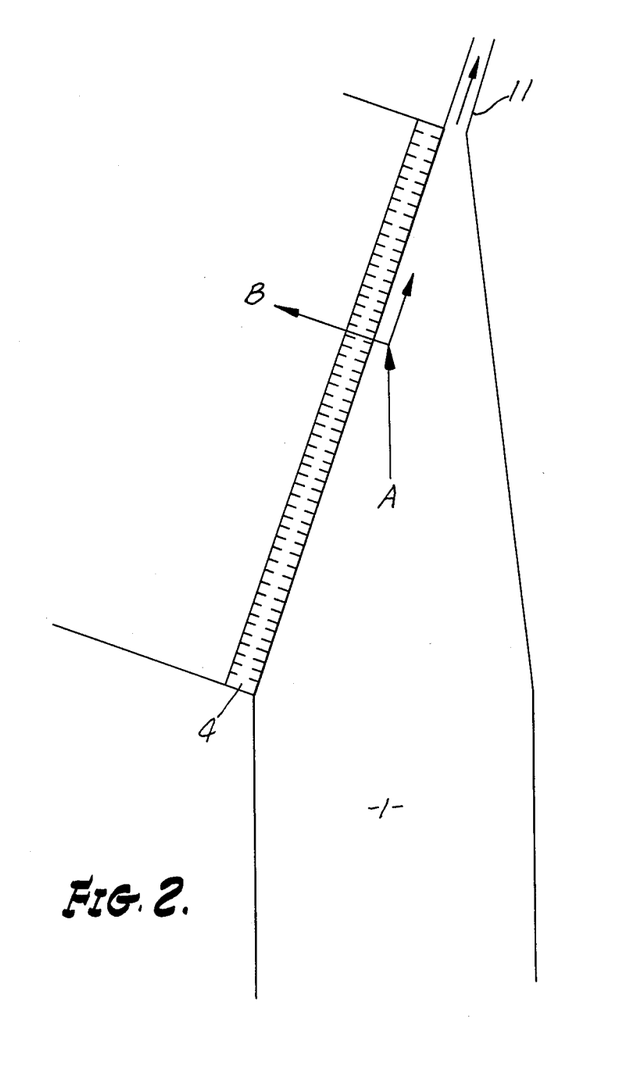
FIG. 2 is a schematic illustration of the flow characteristic of the fish diversion structure of the invention.
Figure 3:
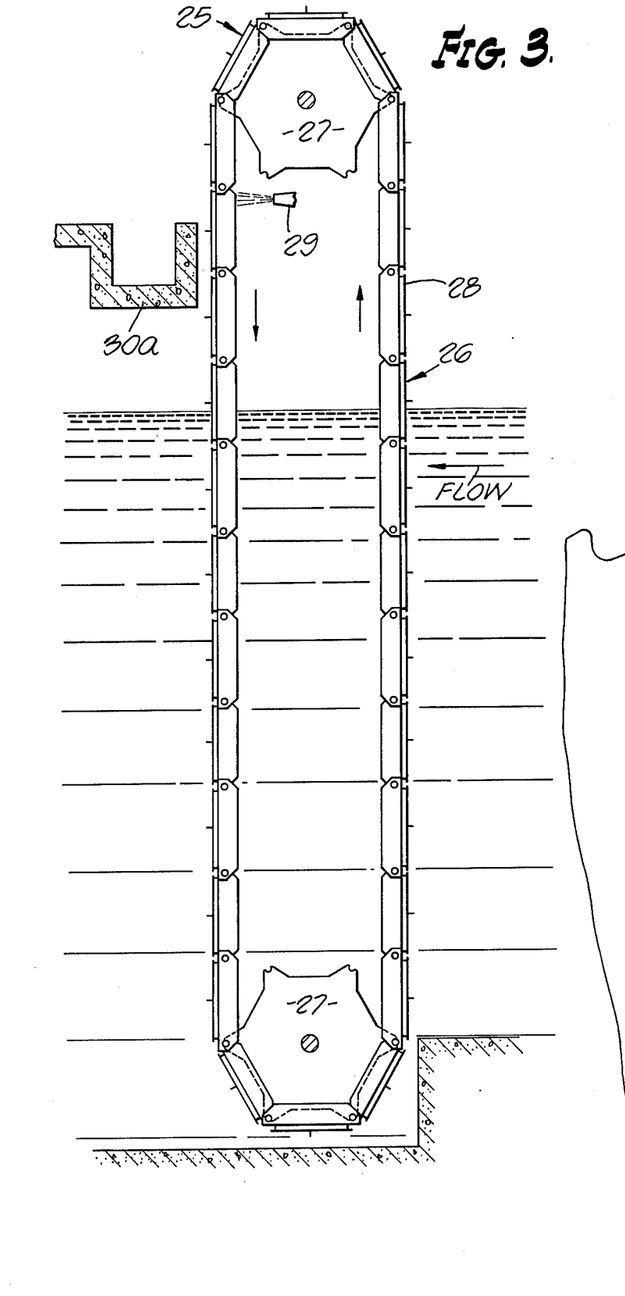
FIG. 3 is a side view of a preferred form of the traveling frame assembly of the fish diversion structure.

On the other hand, the continuous flush face of the fish diversion structure of the present invention and angle to the flow at which it is placed combine with orientation of the louver bars in the traveling frame assembly to effect the velocity components shown schematically in FIG. 2, and thereby satisfactorily guide or divert the fish in a desired direction.

Water in watercourse 1 having horizontal velocity component A approaches fish diversion structure 4 at an angle of about 30° or less and preferably of about 20° or less. The louver bars in fish diversion structure 4 as a result of the sides thereof being angled as shown with respect to the direction of incoming flow sharply turn the major portion of the flow of water in the direction of horizontal velocity component B. At the same time there is created horizontal velocity component C along the flush face of the fish diversion structure 4 toward fish bypass guide channel 11. Component C is much smaller in magnitude than component B. However, it is velocity component C established along the face of fish diversion structure 4 that is believed to be a material factor in causing fish in watercourse 1 approaching fish diversion structure 4 to be diverted or guided downstream along the flush face of the diversion structure. It is believed that the fish in watercourse 1 sense velocity component C and react to it thereby avoiding the fish diversion structure and remaining at a distance from the face thereof.

It is important to the invention herein that the face of fish diversion structure be continuous and flush with no vertical protrusion to interfere with horizontal velocity component C. Such protrusions would adversely affect the ability of the structure to successfully guide fish along the face to the fish removal means. However, horizontal protrusions from the flush face of structure 4 have been found not to interfere with the fish guidance characteristics of the structure.

In order to achieve the superior fish diversion characteristics of the water intake system of the invention it is important that the angle to flow of the continuous flush face of the fish diversion structure 4 be about 30° or less. Within that criteria, selection of the approach angle of the water to the fish diversion structure may vary. For example the embodiment of the invention depicted in FIG. 1 is suitable for use with a water intake system designed to provide 1850 cubic feet per second of water. In that system the approach angle of 20° to flow was found optimum. However, approach angles as low as 10° also provide relatively effective guiding characteristics. The lower limit of the approach angle depends essentially of hydraulic considerations of the system rather than the effect on the fish.

Various fish removal means might be used in the system in conjunction with the fish diversion structure. For example for some species of fish, a "quiet area" substantially free of directional currents at the downstream end of the fish diversion structure might be suitable. Such species of fish would include those that congregate in a quiet area and do not attempt to re-enter the watercourse.

However, other species of fish do not remain in a quiet area but rather they continually attempt to re-enter the flow of water in the watercourse. This results in the fish becoming progressively more fatigued and eventually impinging upon or passing through the louver bars of the fish diversion structure. Where such species of fish are expected to be encountered in the water drawn into the water intake system, the particular fish removal means depicted in FIG. 1 effectively induce the fish to leave the watercourse through fish bypass guide channel 11 and collect in quiet area 17 of fish holding chamber 15. The design of the fish bypass guide channel and fish holding chamber of this embodiment of the invention is discussed more fully below.

Whether a quiet area, or a bypass channel and holding chamber arrangement, or some other fish collection means are used fish collected therein may be removed by any suitable removal means and returned to the body of water. For example, it has been found that fish congregating in quiet area 17 may be lifted by means of a basket from whence they can be placed in a fish return conduit and returned to the body of water. Fish pumps or a method of isolating and flushing the collection area might also be employed to return the fish to the body of water.

Referring now in greater detail to the diversion structure and the traveling frame assemblies thereof, as shown in FIGS. 3 – 6, each traveling frame assembly 25 is comprised of a plurality of louver bar frames 26 joined adjacently together in a continuous belt arrangement. Each assembly 25 is positioned between the adjacent supporting piers in the fish diversion structure and flush therewith so that the flush front face of the assembly forms a part of a continuous flush face across the entire fish diversion structure. Rotation means 27 slowly rotate the frames 26 of each assembly so that the face of the frames facing the flow move continuously upward when trash removal requires such movement. Preferably a mesh screen extends across the front face of the frames and louver bars to screen from the water flowing through the assembly small debris. Trash lips 28 extending horizontally across the frames are provided so that when the frames are drawn out of the water by rotation means 27 trash accumulated in front of the louver bars, or screens when included, will be carried on the lip with the frame until being washed therefrom by spray nozzles 29a into trash removal trough 30a. Such trash lips 28 do not affect the guidance characteristics of the frame assembly.

Figure 4:
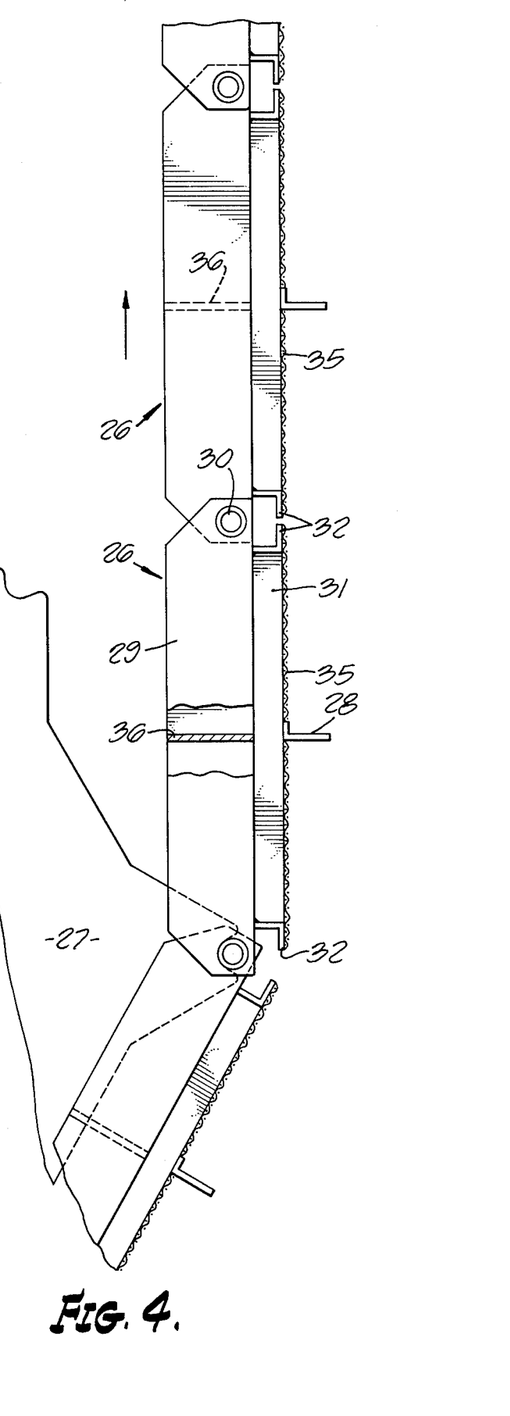
FIG. 4 is an enlarged fragmentary view of the traveling frame assembly shown in FIG. 3.

As shown in FIG. 4, the frames 26 include links 29 connected by a roller pin 30. The links have side members 31 and cross members 32 extending therefrom.

Figure 5:
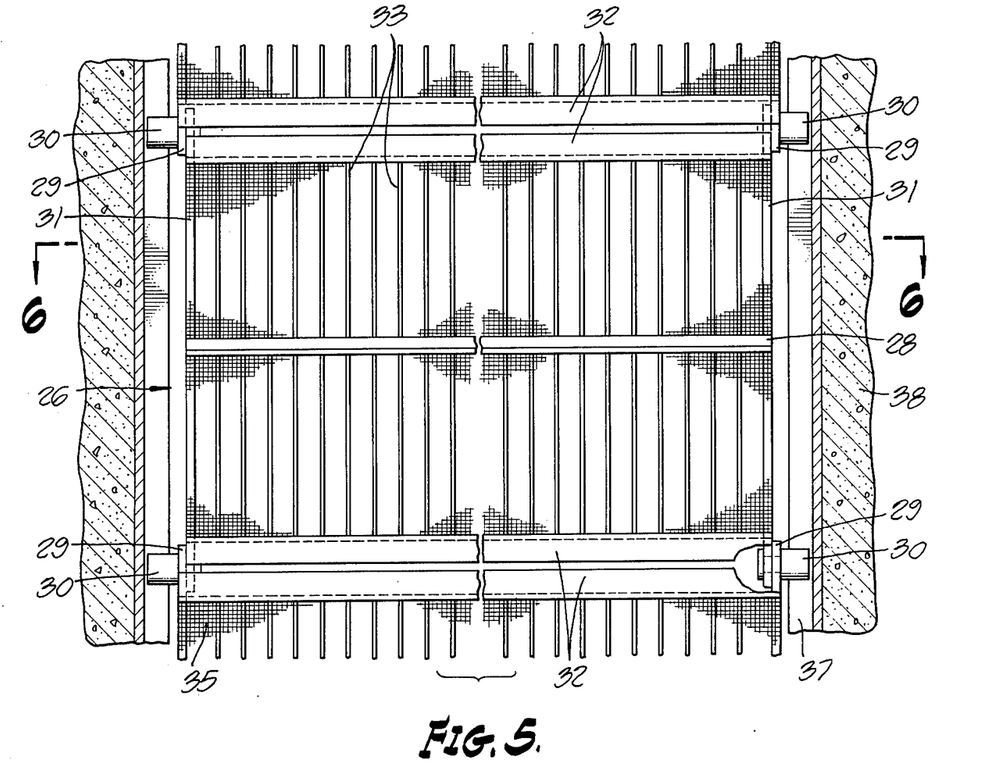
FIG. 5 is an enlarged fragmentary front view of the frame assembly shown in FIG. 2.
Figure 6:
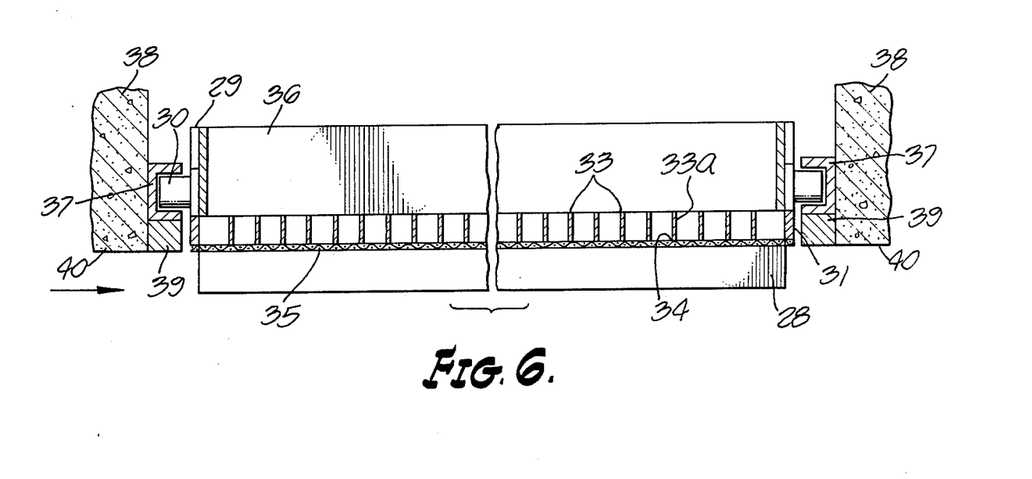
FIG. 6 is a sectional view of the frame assembly of FIG. 5 taken along line 6-6.

The arrangement of the louver bars in the frame assembly of the invention is best shown in FIGS. 5 and 6. The louver bars 33 are mounted vertically in the frame 26 between cross members 32 with the sides 33a thereof each extending in a plane essentially perpendicular to the vertical plane of frame 26 as defined by the front edges of the sides 31 and the front of the cross members 32. The front edges 34 of the louver bars are flush with the front edges of frame sides 31. As indicated previously, a screen mesh 35 is preferably provided across the front of the louver bars 33 to screen debris from water flowing through the assembly. The provision of the screen 35 while not contributing to the fish guiding and diversion characteristics unexpectedly does not detract from those characteristics attributable to the present invention. It was heretofore expected that placing such a screen on the front of the louver bars would detrimentally effect the diversion and guidance characteristics offered by the louver bars, since previous tests had determined that traveling screens even when placed at an angle of about 30° or less to the flow of water in an intake system resulted in impingement of fish on the screens.

By thus combining fish diversion and screening functions in one assembly considerable economic savings in both construction and operation are obtained since, if screens could not be combined with louver bars, it would be necessary to build a separate conventional screen arrangement downstream of the louver bar assembly to remove debris passing through the louver bars.

Screen mesh sizing is largely determined by the end use to which the water is to be put. For example in steam generating plant cooling systems the screen mesh "center to center" size is generally about 75% of the inside diameter of the condenser tubes. However the use of any size screen 35 which effects the desired degree of debris removal but does not interfere with the fish guidance characteristics of the fish diversion structure is within the scope of the invention.

Frames 26 are provided with stiffener 36 mounted behind the louver bars between links 29 in a horizontal plane with respect to the flow. Guide pins 30 ride in channels 37 provided in support structures 38. Fillers 39 are provided between support structures 38 and frame sides 31 so that no significant gap is present between the flush face of the louver bars and the support structures.

The sizing of the traveling frames and louver bars of the invention may vary with differing applications, depending primarily upon the velocity of water required to be drawn through the intake system, the trash head differential, and characteristics of the fish expected to be encountered within the system. For any combination of species of fish expected to be drawn into the intake system there may readily be determined a minimum velocity of flow in the intake system which allows the fish to orient themselves to the flow and maintain their position in the watercourse without undue random swimming. There may also be readily determined a maximum flow rate of water in the watercourse above which the fish are not able to sufficiently resist the flow to be guided by the intake structure but rather impinge on or pass through the louver bar assembly. The water intake system may then be designed so that the maximum and minimum velocity of flow of water within the system is selected to fall between the pre-determined maximum and minimum values.

Once the acceptable flow rate range has been selected, the sizing and spacing of the louver bars is determined. The louver bars are of a sufficient width along the side faces 33a from their front edge to their back edge to insure that a major portion of the intake water, represented by component B in FIG. 2, is sharply turned in the direction of the plane of the louver bars. Preferably the louver bars are spaced apart a distance which effects the desired diversion characteristics of the system. That is, the bars must not be so far apart that the component of flow along the flush face of the bars, represented by component C in FIG. 2, is so small that the fish are not guided thereby.

Where the water intake system is to be used in Southern California ocean waters, the major species of fish expected to be drawn into the system are Northern Anchovy, Queen Fish, White Croaker, Shiner Perch and Walleye Surfperch. For these species of fish it was determined that the approach velocity of water to the louver bar assembly should be between about 2.5 feet per second and about 1.5 feet per second. For this flow rate it was then determined that louver bars 3/16 of an inch thick and two inches wide mounted in frames so that the clear distance between adjacent bars is one inch could be employed to successfully guide these species of fish along the face of the fish guidance structure and into fish removal means.

Where, as in Southern California waters, some species of fish expected to be drawn in with intake water will not congregate in a quiet area provided at the immediate downstream end of the fish diversion structure of the invention, it is desirable to provide means to induce diverted fish to leave the water course and enter an area from which they may be removed. This is accomplished by providing a fish bypass guide channel disclosed herein through which a small portion of the water in the water intake system flows. The bypass channel is depicted in detail in FIG. 7.

Some species of fish, especially schooling species like Anchovy, while first entering a bypass channel tend to then swim back into the water course. This results in fish becoming very fatigued as they continually fight the flow of current. They then finally either cease to be able to react to the guiding components along the louver bar structure or pass through the bypass channel only in such a weakened condition that it was detrimental to their health. It is felt that one reason these species of fish are reluctant to enter and continue through a bypass channel may be that they see other fish swimming upstream of them and, being schooling fish, are attracted to their upstream brothers. Further, certain species of fish while subject to being induced to enter a bypass channel having water flowing therethrough are very sensitive to any turbulence in the bypass channel and react thereto by swimming out of the channel back into the watercourse. This similarly results in the fatigue phenomena discussed above.

By the fish bypass guide channel disclosed herein, essentially species of the fish sought to be diverted by the fish diversion structure can be removed from the watercourse and conveyed to collection and removal means from which they can then safely be returned to the main body of water.

Figure 7:
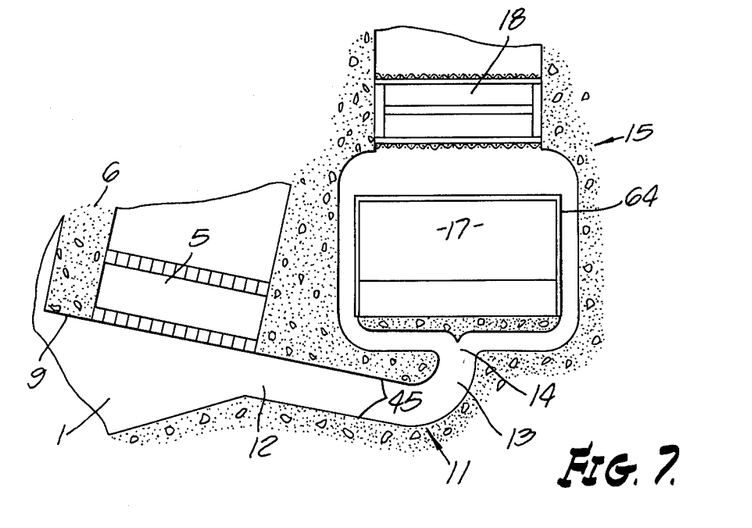
FIG. 7 is illustrating in top plan view a preferred form of the fish bypass guide channel and the holding chamber of the system.

Referring now to FIG. 7, the fish bypass guide channel 11 has an entrance 12 communicating with watercourse 1 to receive a flow of water from the watercourse and exit 14 removed from the watercourse and communicating with fish holding chamber 15. The walls 45 of the guide channel from entrance 12 to exit 14 have smoothly tapering dimensions such that the velocity of the water flowing through the channel is increasingly greater than the velocity of the water approaching the fish diversion structure. In extending from watercourse 1 to fish holding chamber 15, walls 45 are sufficiently smooth and their angle of departure from the walls of watercourse 1 sufficiently small at entrance 12 as to prevent any substantial turbulence in the water flowing through bypass channel 11.

Bypass channel 11 is also provided with a curved section 13 between entrance 12 and exit 14. Curved section or portion 13 is of a sufficient degree of curvature so that there is no direct line of sight from the portion of the channel near entrance 12 to the portion of the channel near exit 14. Preferably curved portion 13 effects a curve of about 90° between inlet 12 and exit 14. However the degree of curvature may vary so long as it is sufficient to prevent fish from seeing other upstream fish after entering the channel and thereby attempting to swim back out of the channel again.

The desired increase in velocity to be obtained by the tapering of walls 45 also depends upon the species of fish which are being induced to enter the bypass channel. For example, for species of fish expected to be encountered in Southern California coastal waters an increase in velocity of at least about 0.5 feet per second over the approach velocity of the water to the fish diversion structure provides superior results in inducing such fish to enter and pass through the bypass channel. A velocity change of greater than 0.5 feet per second tends to cause a proportional increase in avoidance of the bypass channel by some species of fish. With fish of other species an increase in velocity of a smaller magnitude may still provide suitable results.

Figure 8:
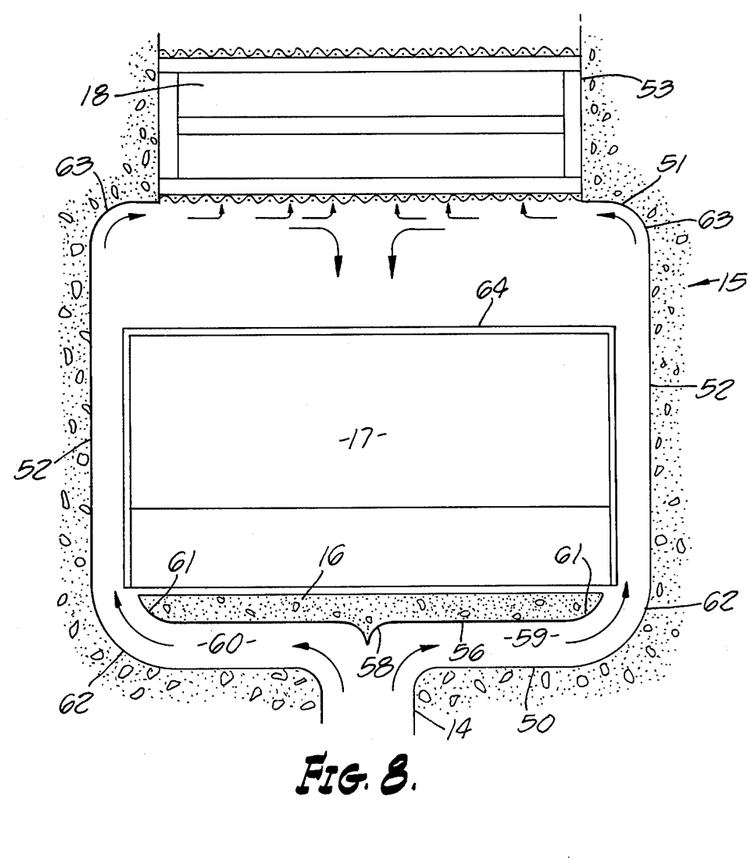
FIG. 8 is an enlarged top plan view of the fish holding chamber of FIG. 1.

Moreover, while fish in some instances might be induced to enter and pass through a bypass channel not designed to result in an increase in velocity over the length thereof such an increase provides for better results in inducing fish to enter the channel and insures that fish arrive in the holding means at the exit of the channel sooner and in a better condition.

Where fish diverted by a fish diversion structure are induced to leave the watercourse of a water intake system by water flowing through a guide channel located at one end of the fish diversion structure, flow through the bypass channel may be maintained either by connecting the bypass channel to the main circulating pumps in the pumpwell or by auxiliary pump means. In either case however, it is still necessary to screen the fish from the water before they reach the pumps. For this purpose a fish holding chamber as shown in FIGS. 7 and 8 is employed. The chamber collects the fish from the water of the bypass channel whereby the fish may then be readily removed from the holding chamber and returned to the body of water.

The fish holding chamber provides a baffle upon which the flow of water entering the chamber impinges. The baffle is located between the entrance to the chamber and the water exit from the chamber and creates a "quiet area" of water with a current of water moving thereabout. Fish which enter the holding chamber are maintained and congregate in the quiet area of water. Certain fish are attracted to the quiet area of water while other fish tend to stray out of the quiet area. Such strays when outside the quiet area are subjected to the current of water moving thereabout and thus diverted back to the quiet area. Fish in the quiet area readily submit themselves to being removed therefrom. For example, they may be lifted by a basket traveling from the bottom of the chamber to above the surface of the water from where they may be removed unharmed and returned to the body of water.

Referring to FIG. 8, an essentially rectangular fish holding chamber 15 is provided having a frontside 50, a back wall 51 and sides 52. An entrance 14 is located substantially in the center of frontside 50. Entrance 14 corresponds to exit 14 of fish bypass guide channel 11. The back wall 51 is provided with water exit 53 having conventional traveling screen means 18 positioned thereacross. The fish holding chamber 15 is also provided with a baffle 16 having a frontside 56 and a backside 57 with a protrusion 58 located essentially in the center of frontside 56. The baffle 16 is positioned in fish holding chamber 15 to define the inlet into channels 59 and 60 each of which have a cross-sectional flow area approximately one-half the cross-sectional flow area of entrance 14.

Water entering chamber 15 through entrance 14 impinges upon protrusion 58 and is divided into two essentially equal streams each having approximately the same velocity as the water flowing through entrance 14. The ends 61 of baffle 16 and the front corners 62 of the chamber are sized and curved so that water flowing in channels 59 and 60 is turned around the corners without substantial turbulence or increase in velocity. This arrangement results in the water flowing along the sides 52 in a channel of current within the water not substantially larger than channels 59 and 60. The back corners 63 of chamber 15 are also smoothly curved to turn the flow of water and direct it tangentially across the face of the screens in traveling screen means 18. Traveling screen means 18 of chamber 15 is chosen of sufficient size such that the current of flow tangential to the face of the screens is relatively strong in comparison to the flow through the screens.

The fish holding chamber also provides an area 17 of essentially quiet water behind baffle 16 in which no constant vectors of current are noted. Fish entering the holding chamber are maintained in the quiet area 17 and can be kept there for several days without harm to the physical condition of the fish. In addition a relatively strong vector of flow is created tangential to the face of the exit screen 18. This vector is sufficiently strong to prevent an undesired impingement of fish on the screen. Thus fish which stray from quiet area 17 either sense the relatively strong currents along the sides 52 and return to the quiet area or are swept with the current along corners 63 and across the face of the exit screen and then return to the quiet area.

The desirable flowrate of water through traveling screens 18 in exit 51 of fish holding chamber 15 is determined by the characteristics of the species of fish expected to be encountered in the intake water. For example, with the species of fish expected to be encountered in Southern California coastal waters it was readily determined that with an inlet flow of water through entrance 14 of about 3.0 feet per second the provision of exit screen 18 of sufficient size so that the average flowrate therethrough is about 0.8 feet per second resulted in the sufficiently strong vector of current tangentially to the face of exit screens 18 to prevent any fish and most debris from being impinged upon the screen.

The fish maintained in quiet area 17 can then be removed from the fish holding chamber 15 by various methods at least some of which are set forth in the previously identified Stipanov U.S. Pat. No. 3,820,342. One other method of accomplishing such removal is by an elevator basket apparatus. The basket 64 normally rests on the bottom of chamber 15 underneath the quiet area of water. When a sufficient number of fish have congregated in the quiet area 17 the elevator basket 64 may be slowly raised. The fish remain in the elevator basket as it is drawn above the surface of the water and are then removed therefrom and returned to the main body of water.

Figure 9:
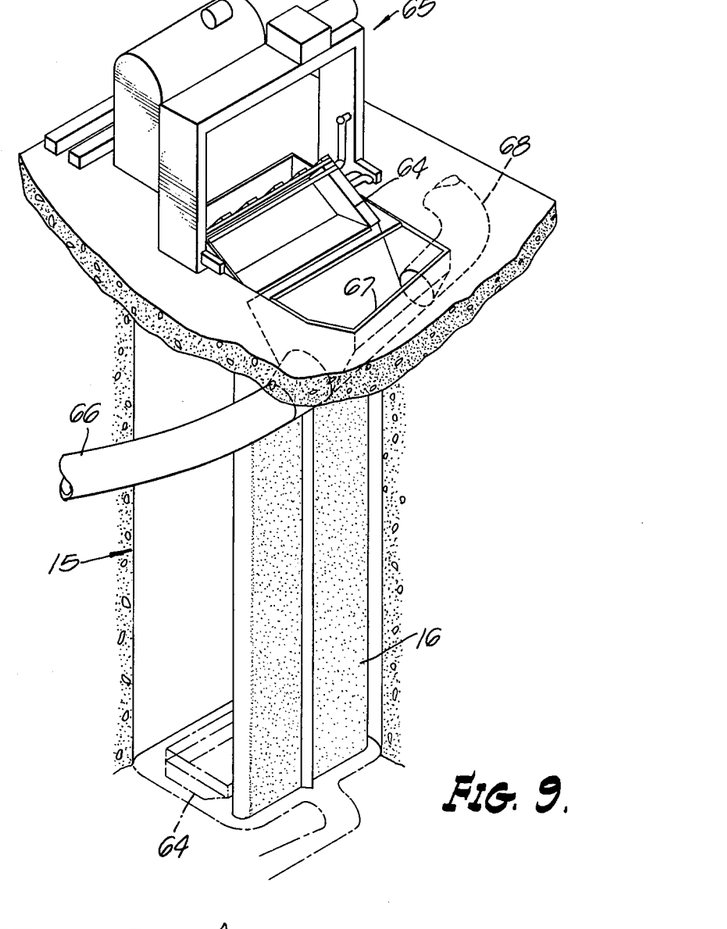
FIG. 9 is a perspective view illustrating suitable fish return means for returning the fish to the body of water from the fish holding chamber.
Figure 10:
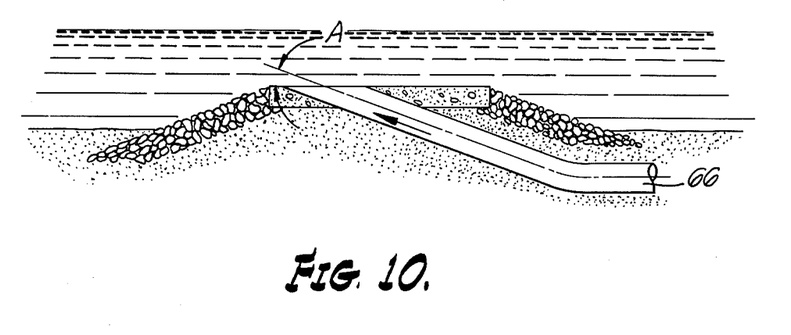
FIG. 10 is a side sectional view of a fish discharge conduit of the fish return means.

The elevator apparatus is depicted in FIG. 9. Since the particular design of fish basket 64 or the return means do not form a part of the invention herein they are not disclosed and are described only generally. In FIG. 9 fish elevator basket 64 is shown in its raised position having been lifted by lifting means 65. Fish return conduit 66 is provided with opening 67 below the raised position of basket 64 and with a flow of water from water inlet 63. The fish are dumped from basket 64 into the water flowing through opening 67 and are swept into fish conduit 66. The velocity of the water flowing through fish conduit 66 should be sufficient to insure that none of the fish can swim against the current of flow and remain in the conduit. For example for species of fish encountered in Southern California waters it was readily determined that a flow of 5.0 feet per second would result in all fish entering conduit 66 being washed therefrom. The fish are discharged from fish return conduit 66 into the main body of water. As shown in FIG. 10 the conduit is preferably placed under the floor of the body of water and then directed upward an angle A of about 20° from the floor. The angle of 20° may vary and any angle which does not result in undue depressurization of the fish, as would result if they were discharged vertically upward, is satisfactory.

Having fully described the invention, it is to be understood that the invention herein is not limited to the details of the embodiments herein set forth or to the details illustrated in the drawings but the invention is of the full scope of the appended claims.

We claim:

1. A fish control system for use in a watercourse through which water flows, comprising:
    a plurality of vertically extending, laterally spaced louver members mounted within at least one traveling frame assembly, each of said louver members having a front edge, a rear edge and side faces therebetween, the front edges of said louver members falling in a common plane and the each said louver member extending from said front edge to said rear edge in a direction substantially perpendicular to said common plane; and
    support means mounting each said traveling frame assembly in said watercourse such that said common plane intersects said watercourse, said support means having surface portions thereof presented to the water flowing in said watercourse, said surface portions falling in the same plane as said common plane of said front edges of said louver members so that fish in said watercourse are diverted past said traveling frame assembly and said support means while water flows between said louver members.

2. The system of claim 1, wherein a plurality of traveling frame assemblies are provided with support means between each said traveling frame assembly.

3. The fish control system of claim 1, wherein said common plane intersects said flow of water at an angle of approximately 30° or less.

4. The fish control system of claim 3 further comprising traveling means causing said traveling frame assembly to travel vertically relative to said support means.

5. The system of claim 4, wherein a plurality of traveling frame assemblies are provided with support means between each said traveling frame assembly.

6. A fish control system for use in a watercourse through which water flows, comprising:
    a plurality of vertically extending, laterally spaced louver members, each of said louver members having a front edge, a rear edge and generally parallel side faces, the front edges of said louver members falling in a common plane and the side faces of said louver members being substantially perpendicular to said common plane; and
    support means mounting said louver members in said watercourse such that a common plane intersects said watercourse, said support means having surface portions thereof presented to the water flowing in said watercourse, said surface portions falling in the same plane as said common plane of said front edges of said louver members so that fish in said watercourse are diverted past said louver members and said support means while water flows between said louver members.

7. The fish control system of claim 6, wherein said plane intersects said flow of water at an angle of approximately 30° or less.

8. The system of claim 6, wherein said louver members are mounted in at least one traveling frame assembly.

9. The fish control system of claim 8, further comprising traveling means causing said traveling frame assembly to travel vertically relative to said support means.

10. The fish control system of claim 9, wherein a plurality of traveling frame assemblies are provided with support means between each said traveling frame assembly.

11. A fish diversion system for use in diverting, the fish in a watercourse through which water flows, comprising:
    a fish diversion structure disposed in and intersecting said watercourse;
    a front face defined by said fish diversion structure and facing the oncoming flow of water in said watercourse, said front face being continuously flush across the entire width thereof and comprising at least one traveling frame assembly having a plurality of vertically extending, laterally spaced louver members, each of said louver members having a front edge, a rear edge and side faces therebetween, the front edges of said louver members falling in a common plane and defining at least a portion of said front face and each said louver member extending from said front edge to said rear edge in a direction substantially perpendicular to said front face; and support means mounting each said traveling frame assembly in said diversion structure whereby fish in said watercourse are diverted past said front face while water flows between said louver members.

12. The fish diversion system of claim 11, wherein said support means have surface portions thereof presented to the water flowing in said watercourse, said surface portions defining at least a portion of said front face.

13. The fish diversion system of claim 11, wherein said front face intersects said flow of water at an angle of approximately 30° or less.

14. The fish diversion system of claim 11, wherein said fish diversion structure further comprises a plurality of frame means, said louver members being mounted in said frame means and said frame means being operably connected to said traveling means.

15. A fish diversion system for use in diverting fish in a watercourse through which water flows, comprising:

a fish diversion structure having a front face presented to the oncoming flow of water, said front face defining a diversion plane;

a plurality of vertically extending, laterally spaced louver members mounted within at least one traveling frame assembly, each of said louver members having a front edge, a rear edge and generally parallel side faces, said side faces being substantially perpendicular to said diversion plane; and support means mounting each said traveling frame assembly in said watercourse such that said front face of said diversion structure intersects said watercourse, said support means having surface portions thereof presented to the water flowing in said watercourse so that fish in said watercourse are diverted past said traveling frame assembly and said support means while water flows between said louver members.

16. A water intake structure comprising side walls forming a channel and spaced, rigid columns within the channel, a series of traveling water screen units supported by and between said columns, the forward faces of the screens of each unit being flush with the faces of the intermediate columns, said faces being arranged in a straight line extending at an angle across the channel and respecting the direction of flow approaching the screens, an opening in one channel wall where said line of screens meets said one wall at said angle, said angle being in the order of 30° so that the fish swimming away from the screens may be carried sideward by the flow in the one direction only which is toward said opening through which they may leave the channel, each screen having a rectangular frame, the frames of the screens of each unit being pivotally interconnected in an endless series, each traveling water screen unit further comprising a rotating drive means over which the series operates and from which the frames are suspended in the water intake channel and means for flushing debris from the upward run of the screens emerging from the channel; the screen of each said unit comprising a series of laterally spaced vertical bars.

17. A fish control system in a water intake structure with side walls forming a channel, comprising:
support means disposed across the channel comprising spaced, rigid columns;
water screen units comprising a plurality of vertically extending, laterally spaced louver members, each said louver member having a forward edge, a rear edge and substantially parallel side faces, said water screen units supported within said channel by and between said columns, said forward edges of said louver membes being flush with the faces of said intermediate columns;
said forward edges and said faces of said intermediate columns being arranged in a traight line extending at an acute angle across the channel and respecting the direction of flow approaching said screen units and said side faces extending substantially perpendicular to the direction of said straight line;
fish exiting means proximate one said channel wall where said line intercepts said one wall at said angle so that the fish in said channel after approaching said screen units are diverted along said line in the one direction only which is toward said fish exiting means by which they exit the channel.

18. The system of claim 17 wherein said angle is not larger than about 30°.

19. The system of claim 17 wherein said angle is from about 10° to about 30°.

20. The system of claim 17 wherein said angle is about 20°.

21. A fish control system in a water intake structure with side walls forming a channel, comprising:
support member disposed across the channel comprising spaced rigid columns;
a plurality of water screen units each comprising a plurality of vertically extending, laterally spaced louver members, each said louver member having a forward edge, a rear edge and generally parallel side faces, said water screen units being supported within said channel by and between said columns, said forward edges of said louver members being flush with the faces of said intermediate columns;
each said water screen unit further comprising a rectangular frame, the frames of each unit being pivotally interconnected in a endless series and a rotating drive means over which the series operated and from which the frames are suspended in the water intake channel;
said forward edges and said faces of said intermediate columns being arranged in a straight line extending at an acute angle across the channel and respecting the direction of flow approaching said screen units and said faces extending substantially perpendicular to the direction of said straight line;
fish exiting means proximate one said channel wall where said line intercepts said one wall at said angle so that the fish in said channel after approaching said screen units are diverted along said line in the one direction only which is toward said fish exiting means by which they exit the channel.

22. The structure of claim 21 further comprising traveling means operably connected to said traveling frame assemblies and causing said frame assemblies to travel vertically relative to said support means.

23. The structure of claim 21 wherein said angle is from about 10° to about 30°.

24. The structure of claim 21 wherein said angle is about 20°.

25. A water intake structure comprising side walls forming a channel and spaced, rigid columns within the channel, a series of traveling water screen units supported by and between said columns, the forward faces of the screens of each unit being flush with the faces of the intermediate columns, said faces being arranged in a straight line extending at an angle across the channel and respecting the direction of flow approaching the screens, an opening in one channel wall where said line of screens meets said one wall at said angle, said angle being in the order of 30 degrees so that the fish swimming away from the screens may be carried sideward by the flow in the one direction only which is toward said opening through which they may leave the channel, each screen having a rectangular frame, the frames of the screens of each unit being pivotally interconnected in an endless series, each traveling water screen unit further comprising a rotating drive means over which the series operates and from which the frames are suspended in the water intake channel and means for flushing debris from the upward run of the screens emerging from the channel, the screen of each said unit comprising a series of laterally spaced vertical bars substantially flush with the front faces of said columns.

* * * * *

UNITED STATES PATENT AND TRADEMARK OFFICE
CERTIFICATE OF CORRECTION

PATENT NO. : 4,064,048
DATED : December 20, 1977
INVENTOR(S) : DALLAS I. DOWNS, LORY E. LARSON, VICTOR J. SCHULER It is certified that error appears in the above–identified patent and that said Letters Patent are hereby corrected as shown below:

IN THE CLAIMS:

14. The fish diversion system of Claim 11 wherein said fish diversion structure further comprises a plurality of frame means, said louver members being mounted in said frame means and same frame means being operably connected to traveling means which causes said traveling frame assembly to travel vertically relative to said support means.

Sheets 2, 3 and 5 of the 6 sheets of drawings should be deleted to insert the attached sheets respectively therefor.

Signed and Sealed this

Twenty-first Day of October 1980

[SEAL]

Attest:

SIDNEY A. DIAMOND

Attesting Officer

Commissioner of Patents and Trademarks